United States Patent

[11] 3,614,179

| [72] | Inventor | James C. Hosken<br>15 Hobart Terrace, Newton Centre, Mass.<br>02159 |
|---|---|---|
| [21] | Appl. No. | 862,890 |
| [22] | Filed | Oct. 1, 1969 |
| [45] | Patented | Oct. 19, 1971 |

[54] BEARING CONSTRUCTION
3 Claims, 3 Drawing Figs.

| [52] | U.S. Cl. | 308/6 R |
|---|---|---|
| [51] | Int. Cl. | F16c 19/00,<br>F16c 29/00 |
| [50] | Field of Search | 308/6 |

[56] References Cited
UNITED STATES PATENTS

| 2,333,611 | 11/1943 | Wolf | 308/6 |
| 2,400,374 | 5/1946 | Selnes | 308/6 |
| 3,059,979 | 11/1962 | Hohl et al. | 308/6 |
| 3,237,471 | 3/1966 | Wunsch | 74/230.17 |

*Primary Examiner*—Martin P. Schwadron
*Assistant Examiner*—Barry Grossman
*Attorney*—Russell & Nields

ABSTRACT: A bearing is provided between a cylindrical member and a tubular member to facilitate relative axial movement of the two members while impeding any other type of movement. The bearing consists of at least two toroids spaced from one another axially. Each toroid comprises a garter spring, that is to say, a helical arrangement which closes on itself so that it forms one closed toroid. The toroids roll in the manner of a smoke ring when relative linear movement of the members occurs.

PATENTED OCT 19 1971  3,614,179

INVENTOR.
JAMES C HOSKEN
BY Russell + Nields
ATTY'S

BEARING CONSTRUCTION

FIELD OF THE INVENTION

The invention relates to bearings and in particular to a bearing permitting relative axial movement between a cylindrical member and a tubular member.

PRIOR ART X

Many types of bearings are known in the prior art including ball bearings, roller bearings, and tapered roller bearings. The most common type of bearing relates to relative rotational movement between a rotating wheel and a stationary shaft or between a rotating shaft and a stationary casing for it. The invention is concerned with a bearing for relative axial movement. Prior art bearings for this type of movement have included sliding contact, ball and roller bearings. One type of bearing permitting relative axial movement is shown in U.S. Pat. No. 3,237,471 to Wunsch. However, the bearing therein shown does not consist of garter springs, and in at least one embodiment of Wunsch's disclosure, namely, that shown in FIG. 5 of said patent, the bearing does not consist of toroids, but rather of one continuous helix. Moreover, as shown in the drawings of said patent, and in particular in FIGS. 1 and 2, the annuli are not spaced from one another. It is also clear that the bearing of said patent relates to very small-amplitude axial movement.

SUMMARY

The invention comprehends a bearing to permit relative axial movement between a cylindrical member and an outer tubular member. In accordance with the invention, the bearing comprises at least two toroids axially spaced from one another. In a preferred embodiment, each toroid comprises a garter spring. It is important that the spring form a closed toroid in order that the rotation of the spring during relative axial movement of the cylindrical members be uniform. A particular advantage of the invention is the elimination of a lubricant making possible use in vacuo such as certain vacuum tubes or in space. Sliding movement between two members in vacuo tends to cause a weld between them so that the rolling bearing is to be preferred. If adequately spaced from one another, only two toroids need be used, although it is possible to use a greater number. The shape of the toroid tends to prevent relative rotary movement between the tubular member and the cylindrical member, while the fact that the two toroids are spaced a substantial distance from one another prevents wobble motion between the two members.

DESCRIPTION OF THE PREFERRED EMBODIMENTS

The invention may best be understood from the following detailed description thereof, having reference to the accompanying drawing in which.

Figure 1:
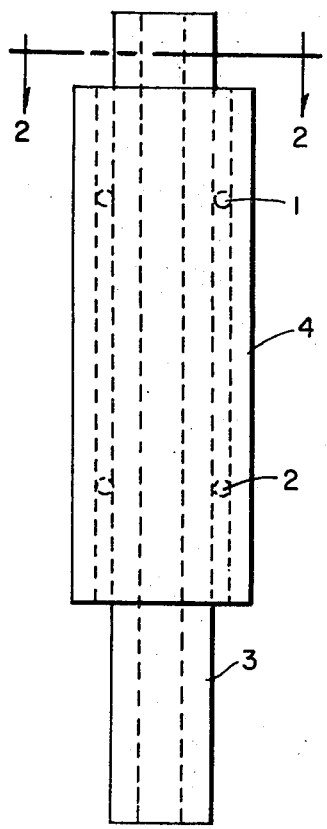
FIG. 1 is a side elevation of a tubular member and a cylindrical member within it, with a bearing constructed in accordance with the invention, between them.
Figure 2:
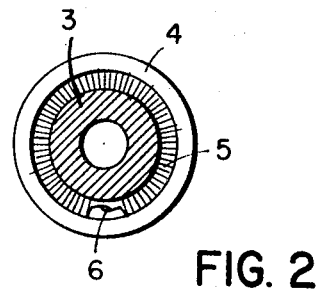
FIG. 2 is a transverse section along the line 2—2 of FIG. 1.

Referring to the drawing, and first to FIGS. 1 and 2 thereof, two toroids 1,2 are slipped around the outer periphery of a cylindrical member 3 and are axially spaced from one another. A tubular member 4 is then slipped over the assembly of toroids 1,2 and cylindrical member 3 so that the entire group of parts may assume the configuration shown in FIG. 1. Each toroid 1,2 may be much like an ordinary spring, although it should have a small pitch so as to provide a relatively closely packed helix. For example, each toroid may comprise such a spring 5 the ends of which are hooked together as shown at 6 in FIG. 2 so as to form a closed toroid.

The invention is particularly useful for bearings in vacuo such as in certain large vacuum tubes or in devices for use in outer space. This is because of the fact that in vacuum operations, it is not possible to use lubricants so that any sliding joints tend to form welds. The bearing of the invention avoids this problem.

Another use of the invention is for extendable cranes which support heavy devices such as microphones or lights in cantilever.

Figure 3:
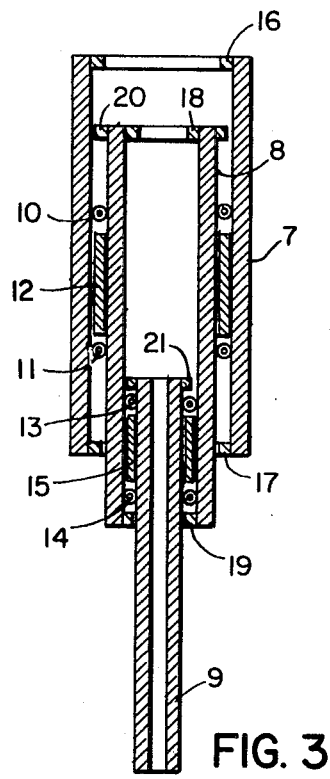
FIG. 3 is a side elevation of a plurality of tubular members in nesting relationship, adjacent members being mutually separated by a bearing constructed in accordance with the invention.

The invention also comprehends a plurality of tubes in nested arrangement with bearings in accordance with the invention between adjacent tubes, as shown in FIG. 3. Such an arrangement is particularly useful in the case of cantilever supports where extension of the ends of the object supported is desired.

Referring to FIG. 3, an outer tube 7, an intermediate tube 8 and an inner tube 9 are arranged concentrically. Each of these tubes may be an extruded aluminum tube having a wall thickness of one-sixteenth of an inch. In a representative embodiment, the outer diameter of the outer tube 7 might be 2 inches. The outer tube 7 is spaced from the intermediate tube 8 by a pair of toroids 10,11. The toroids 10,11 are spaced from each other by a tubular spacer 12 12 which should be of lightweight and which should have a wall thickness less than the diameter of the toroids 10,11 so that it fits loosely between the outer tube 7 and the intermediate tube 8. In similar fashion, the inner tube 9 is separated from the intermediate tube 8 by two toroids 13,14 which may be identical to the toroids 10,11 except for their overall diameter. The toroids 13,14 are separated from each other by a spacer 15 which may be similar to the spacer 12 except for its diameter. The thickness of all the toroids may be, for example, one-eighth of an inch. After assembly of the tubes, toroids, and spacers, stops may be provided at the extremities of the tubes in order to prevent accidental disassembly of the device. Stops 16,17 may be provided within the outer tube 7 at its extremities and affixed thereto in any appropriate manner, such as by being pinned thereto or by being affixed by means of screws. These stops 16,17 may be made of aluminum. A similar pair of stops 18,19 may be affixed within the intermediate tube 8 at its extremities. An additional stop 20 is affixed to the outer surface of the intermediate tube 8 at that extremity of the intermediate tube 8 which lies within the outer tube 7. In similar fashion a stop 21 is affixed to the outer surface of the inner tube 9 at that extremity thereof which lies within the intermediate tube 8. The various stops determine the maximum travel of the toroids while the various spacers determine the minimum spacing between toroids. By extending the various tubes to their maximum extent of travel, any misalignment or skewing of the toroids that may have arisen will be corrected, since they will be pressed between the stops and the spacers. It is to be observed that whenever there is relative movement of one tube with respect to another the velocity or displacement of the intervening toroids with respect to either of the tubes will be one-half the velocity or displacement of the other tube with respect to the former tube.

The bearing of the invention is useful with any cross-sectional configuration of tubes subject only to the limitation that the circumference of the tube which abuts against the toroid should be constant throughout the length of the bearing surface of the tube. Thus, deviations from the circular in forming aluminum extrusions have no adverse effect on the functioning of the invention.

Having thus described the principles of the invention together with several illustrative embodiments thereof, it is to be understood that although specific terms are employed, they are used in a generic and descriptive sense and not for purposes of limitation, the scope of the invention being set forth in the following claims.

I claim:

1. A bearing comprising, in combination with a first member having an outer surface and a second member disposed coaxially with respect to said first member and having an inner surface, at least two closed, continuous toroids axially spaced some distance from one another between said surfaces, the circumference of each of said surfaces in planes normal to the common axis being substantially the same for all portions thereof against which a toroid may abut in normal use, said toroids each including a continuous member disposed along an annular axis about which it is adapted to rotate, and each including means to enable the ends of said continuous member to be joined so that each toroid is mechanically closed so as (1) to restrain displacement of all portions of said toroid with respect to said annular axis and (2) to hold said toroid tightly against said inner member so that said annular axis is maintained in a plane which is perpendicular to the common axis of said members, whereby relative motion of said members causes movement of said plane along said common axis while maintaining said perpendicular disposition.

2. A bearing according to claim 1, wherein each toroid comprises a continuous helical strand the ends of which are joined so as to form a closed toroid.

3. A bearing comprising, in combination with a plurality of members arranged in mutually nesting relationship (at least all but the innermost member being tubular), at least two closed, continuous toroids axially spaced some distance from one another between each pair of adjacent members, the circumference of each surface which abuts a toroid being substantially the same for all positions assumed by said toroid in normal use, said toroids each including a continuous member disposed along an annular axis about which it is adapted to rotate, and each including means to enable the ends of said continuous member to be joined so that each toroid is mechanically closed so as (1) to restrain displacement of all portions of said toroid with respect to said annular axis and (2) to hold said toroid tightly against said inner member so that said annular axis is maintained in a plane which is perpendicular to the common axis of said members, whereby relative motion of said members causes movement of said plane along said common axis while maintaining said perpendicular disposition.